3,380,465
PNEUMATIC OR HYDRAULIC
ADDING CIRCUIT
Janos Rona, Bordeaux, Gironde, France, assignor to Societe Nationale d'Etude et de Construction de Moteurs d'Aviation, Paris, France, a company of France
Filed Jan. 20, 1964, Ser. No. 338,709
Claims priority, application France, Jan. 22, 1963, 922,311
3 Claims. (Cl. 137—81.5)

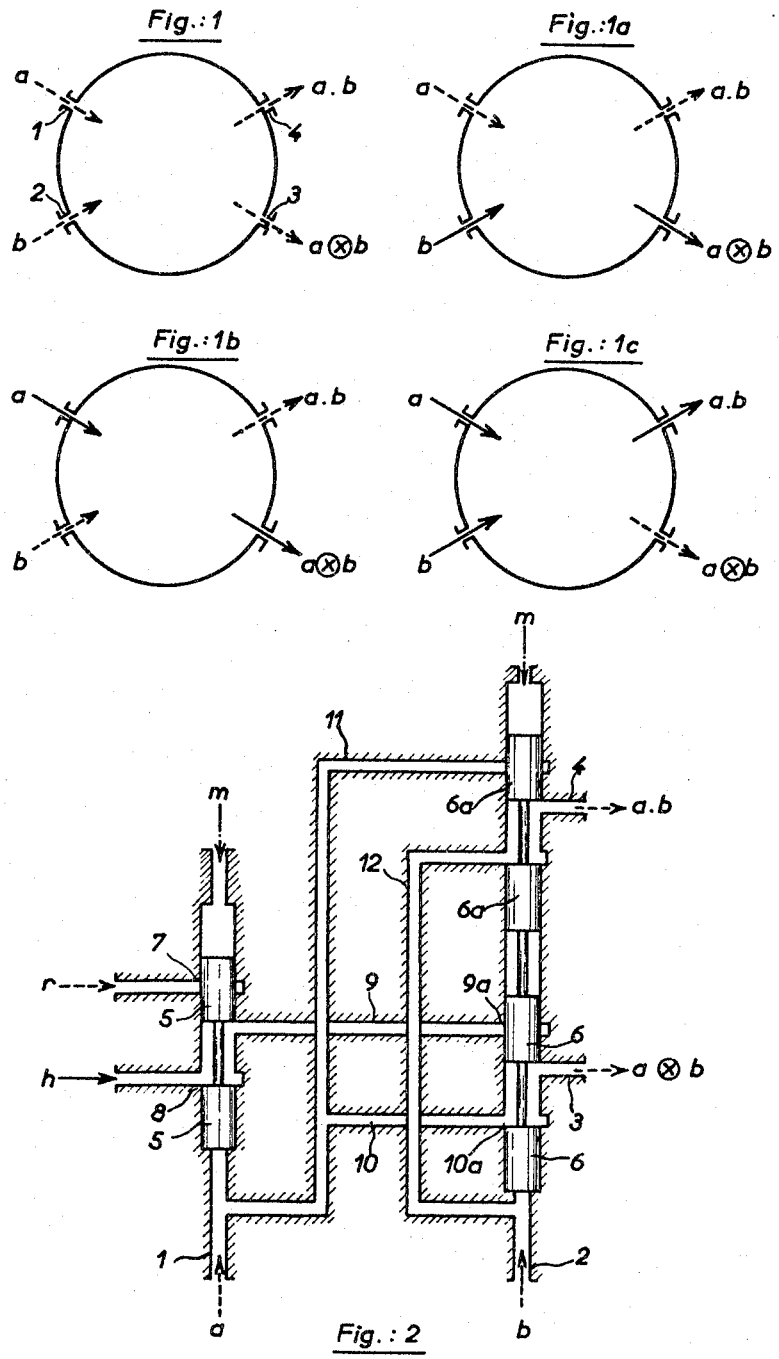

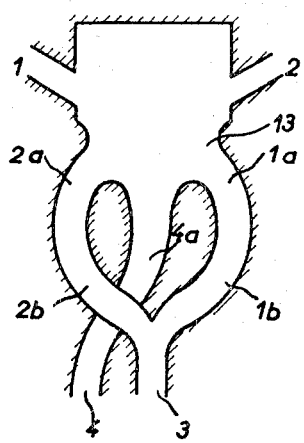
Fig.:3
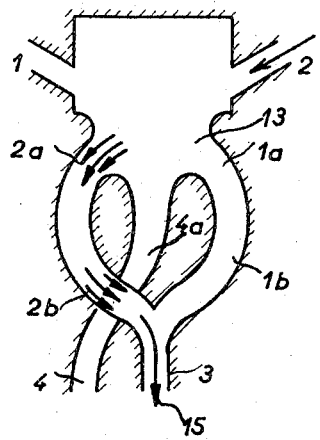
Fig.:3a
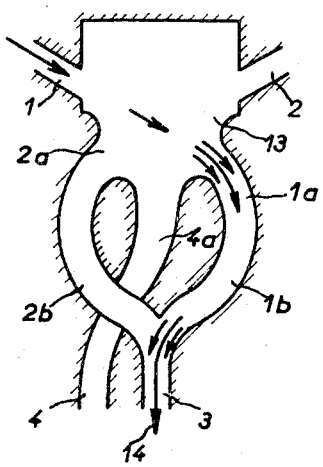
Fig.:3b
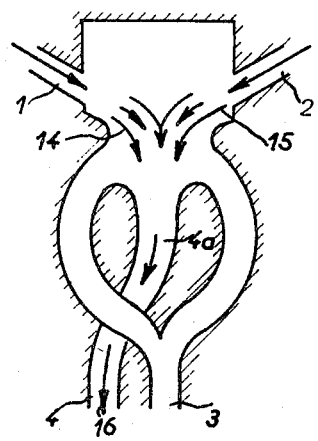
Fig.:3c

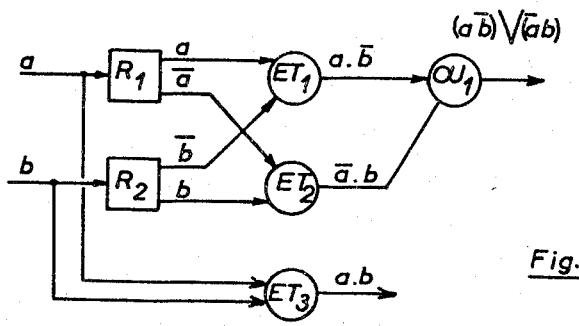
Fig.: 4
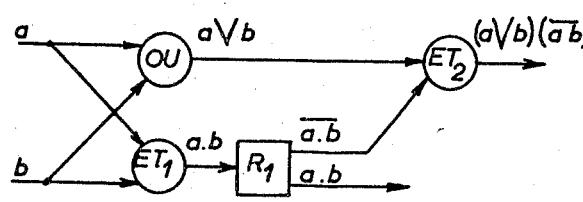
Fig.: 5
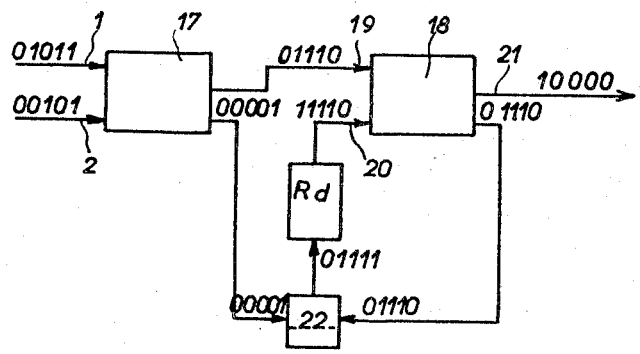
Fig.: 7

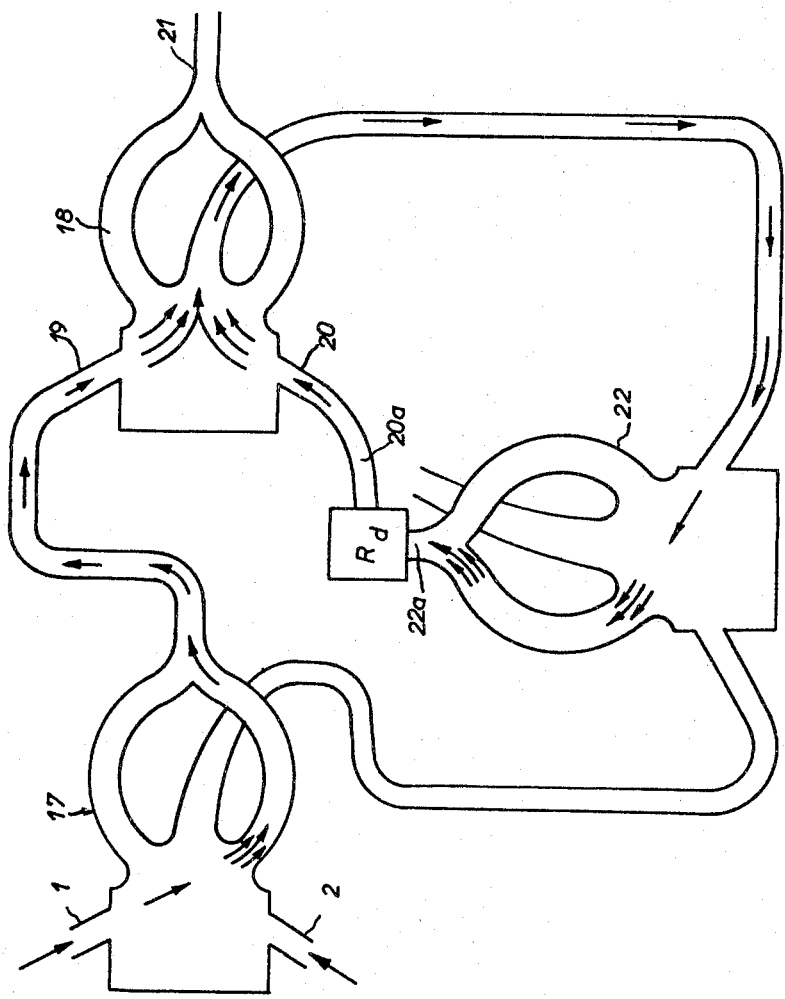
Fig.: 6

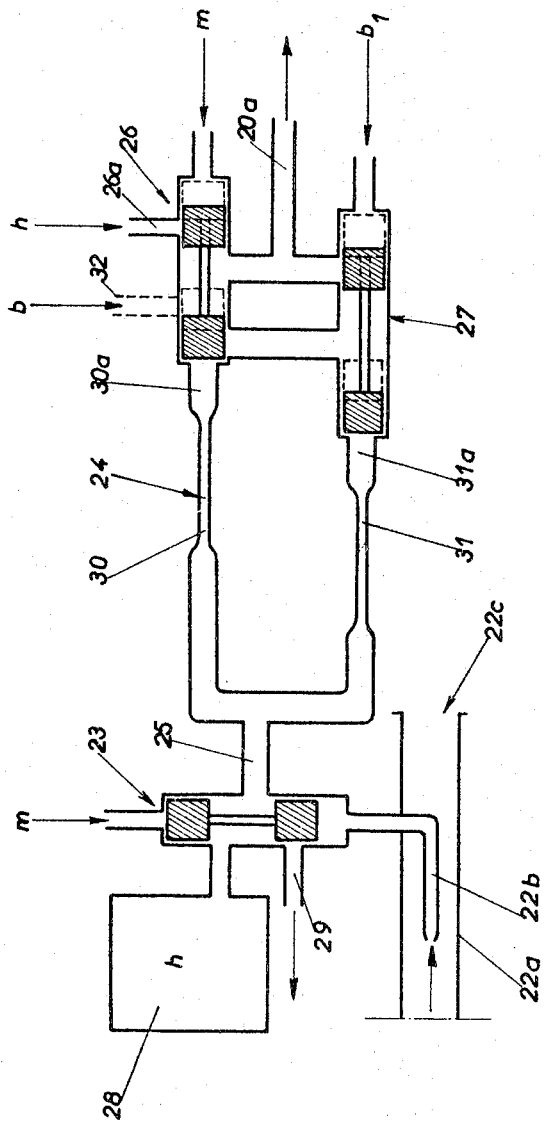
Fig.:8

ABSTRACT OF THE DISCLOSURE

A pneumatic or hydraulic adding logic circuit, usable with the binary rotation system, comprising two elements with the output from the first element being connected to an input of the second element, the other input to said second element being connected to a delay element connected to each of the outputs of the second element to thereby receive the combined signals issuing therefrom.

---

This invention relates to pneumatic or hydraulic logic circuits, more particularly for use in digital computers and the automation industry. It includes the provision of a basic logic circuit for simultaneously performing intersection operation, often known as the AND-operation, and dilemma operations, also known as the EXCEPT-operation.

The invention also includes a delay device susceptible of transmitting a pneumatic or hydraulic signal with a determinate time-delay, more specifically for storing the output signal of an operation and using it as the input signal for a subsequent operation. The invention includes logic circuits comprising such circuit elements and delay devices.

It is well known that the three fundamental operations in Boolean algebra correspond to the three basic logic operations of complementarity, intersection and reunion, and permit, respectively, of causing to correspond to a Boolean quantity $a$ its complement $\bar{a}$, to two quantities $a$ and $b$ their interesction $a.b$, and to two quantities $a$ and $b$ their reunion $aVb$. Each of these fundamental operations can be performed in a manner well known per se by means of a basic logic circuit. By way of example, an electronic trigger circuit will perform the complementarity, a "gate" the coincidence, and a cathodyne-type circuit the reunion.

A very important operation is the EXCEPT-operation which causes to correspond, to two Boolean quantities $a$ and $b$, the dilemma $a \otimes b$. This is not a basic logic operation, and electronic or electric machines can perform it only by a combination of basic logic circuits.

Problems frequently arise that cannot be solved unless $a \otimes b$ and $a.b$ are alike available, thereby requiring the use of several basic logic circuits. In binary adders in particular, the addition of the digits of equal weight must give the sum and the carry-over. In the automation industry, when it is desired for example to control lifts or to perform switching operations on railway lines, the EXCEPT-operation and the AND-operation often have to be performed simultaneously.

These problems can be solved by means of a single basic logic circuit consisting of a hydraulic or pneumatic valve.

Such a valve comprises two inlets which simultaneously receive binary signals in the form of pressure pulses, and two outlets whereat signals are picked up simultaneously in the form of mass flows, the digit "one" being conventionally represented by a high pressure and the digit "zero" by a low or zero pressure, said valve being so devised that the high-pressure fluid flows through the first outlet only if one of the inlets alone is supplied at high pressure, but through the second outlet if the two inlets are simultaneously supplied at high pressure.

The said valve may comprise one or more moving mechanical components such as pistons or slide-valves and may also require the use of an external power source, such as functional pressures at different pressure levels. The valve, however, is preferably an aerodynamic or hydrodynamic valve, i.e., a valve which switches a flow to either outlet solely by the purely dynamic action of the incident flows constituting the input signals.

In the case of the binary adders referred to precedingly, it becomes necessary to store the carry-over resulting from the addition of the digits of equal weight, in order to add it subsequently to the sum of the digits of greater weight, which in turn calls for the use of a pneumatic or hydraulic delay device.

An object of the invention is to provide a fluid full adder adapted to add successively the digits of equal weight with the carry-over resulting from the addition of the digits of smaller weight.

Another object of the invention is to provide a fluid full adder incorporating a delay device which is capable of transmitting with a determinate delay binary signals in the form of high-pressure pulses representing the digit "one" and zero or low-pressure pulses representing the digit "zero." In one form of embodiment, a delay device essentially comprises a delay element consisting of two paralleled capillary tubes simultaneously receiving input signals, preferably through the agency of a relay which converts them into high-pressure and zero-pressure pulses, a transmitter element for emitting output signals at high pressure or at zero or low pressure according as the output pressure from the first capillary tube is greater or less than a determinate intermediate pressure, and a gating or blocking element for applying to the outlet of said first capillary tube the high pressure derived from the output signal as long as the pressure at the outlet of the second capillary tube is greater than a determinate pressure which is in turn less than said intermediate pressure.

The description which follows with reference to the accompanying non-limitative exemplary drawings will give a clear understanding of the various features of this invention and of the art of carrying them into practice, all such dispositions as emerge either from the description or the drawings naturally falling within the scope of the invention as defined in the appended claims.

Referring to the drawings filed herewith:

FIGURES 1, 1a, 1b, 1c show diagrammatically the combination of the signals in a valve according to the invention.

FIGURE 2 shows a first form of embodiment consisting of a valve with slide-valves.

FIGURES 3, 3a, 3b and 3c show an alternative form of embodiment consisting of an aerodynamically operating valve.

FIGURES 4 and 5 are circuit diagrams of two electronic "half-adders."

FIGURE 6 shows an adding circuit.

FIGURE 7 shows the logic diagram of the circuit of FIGURE 6, and

FIGURE 8 shows diagrammatically a delay device.

FIGURES 1, 1a, 1b and 1c schematically illustrate the four positions of a valve having two inlets 1, 2 and two outlets 3, 4 and which constitutes a logic circuit according to the present invention. The signals $a$ and $b$ enter respectively at 1 and 2 and the signals $a \otimes b$ and $a.b$ emerge respectively at 3 and 4. The "one" signal is represented by an arrow drawn with a solid line and the "zero" signal by an arrow drawn with a broken line. At the inlet end, the "one" signal is a pressure pulse which produces a flow of fluid through the inlet 1 or 2; the "zero" digit will generally be a pressure pulse of lower level when the fluid is a liquid, or the absence of a pulse when the fluid is a gas. At the outlet end, the "one" signal is picked up as a fluid flow through the outlet 3 or 4, and the "zero" signal as a liquid flow at low pressure level, or as the absence of a gas flow. When the outlets 3 and 4 are connected to ducts of a logic circuit, these flows or absences thereof engender, at the downstream end, pressure pulses which can be used as input signals into the subsequent elements of the logic circuit.

The valve is so devised internally that a "one" pulse applied at 1 or 2 emerges at 3 if the pressure pulse applied to the other inlet is at "zero" level, or at 4 if the pressure pulse applied to the other inlet is "one" (FIGURE 1c), and whichever of outlets 3 and 4 is not traversed by a "one" pulse is traversed by a "zero" pulse, whereas "zero" pulses applied simultaneously at 1 and 2 emerge simultaneously at 3 and 4 (FIGURE 1).

A comparison between the drawing and the following table does indeed show that if the signals $a$ and $b$ are applied simultaneously at 1 and 2, the signals picked up will be $a \otimes b$ at 3 and $a.b$ at 4:

|  | a | b | $a \otimes b$ EXCEPT | a.b AND |
|---|---|---|---|---|
| Figure 1 | 0 | 0 | 0 | 0 |
| Figure 1a | 0 | 1 | 1 | 0 |
| Figure 1b | 1 | 0 | 1 | 0 |
| Figure 1c | 1 | 1 | 0 | 1 |

Persons familiar with Boolean algebra will immediately appreciate that $a \otimes b$ is the sum of two digits $a$ and $b$ of identical weight and that $a.b$ is the carry-over.

FIGURE 2 shows a form of embodiment in which the basic logic circuit consists of a hydraulic valve of the slide-valve type utilizing three pressure levels which are respectively represented by arrows drawn in solid lines for the high pressure $h$, in dot-dash lines for the intermediate pressure $m$ and in broken lines for the low pressure $r$. In the manner well known per se, said valve comprises two slide-valves 5, 6 which sustain on one side the intermediate pressure and on the other the input signals $a$ and $b$, applied respectively at 1 and 2 in the form of high- or low-pressure pulses, the functional pressure $h$ and $r$ being introduced into the valve through ports 7 and 8 respectively, which ports are selectively unmasked by the slide-valve 5 whereby to obtain complement $\bar{a}$ of the signal $a$ in a duct 9. The slide-valve 6 selectively unmasks two ports 9a and 10a, which respectively receive the signal $\bar{a}$ through the duct 9 and the signal $a$ through a duct 10 connected to the inlet 1, whereby to obtain at the outlet 3 the signal $a$ when $b$ is "zero" (as in the example shown in the figure, or the signal $\bar{a}$ when $b$ is "one."

The manner of operation of such a valve is well known per se. In the specific example shown in the figure, the signals applied at 1 and 2 are at low pressure and the two slide-valve 5 whereby to obtain the complement $\bar{a}$ of the pressure $m$ and unmask the ports 8 and 10a. If there be applied to 1 a high-pressure pulse (the "one" signal), the slide-valve 5 will rise and unmask the port 7 while at the same time masking the port 8. Application of the high pressure at 2 actuates slide-valve 6, which unmasks port 9a and masks port 10a.

The valve is furthermore so devised internally that the outlet 4 receive the signal $a$ when $b$ is "one" and the signal $b$ when $b$ is "zero." Slide-valve 6 is accordingly extended by an element 6a which places the outlet 4 in selective communication with a duct 11 leading to the inlet 1 or with a duct 12 leading to the inlet 2.

The table below shows the signals issuing at 3 and 4 as a function of those applied at 1 and 2.

| Inlet 1, a | Inlet 2, b | Outlet 3 | Outlet 4 |
|---|---|---|---|
|  |  | In communication with— | |
| 0 | 0 | a=0 | b=0 |
| 0 | 1 | $\bar{a}$=1 | a=0 |
| 1 | 0 | a=1 | b=0 |
| 1 | 1 | $\bar{a}$=0 | a=1 |

A comparison between this table and that given precedingly shows that the signals issuing from 3 and 4 are $a \otimes b$ and $a.b$, respectively.

The logic circuit shown in FIGURES 3 to 3c consists of an aerodynamic valve. This circuit is of the pneumatic type, the "one" signal being represented by pressure pulses of determinate duration and the "zero" signal by the absence of a pulse of such duration. The inlets 1 and 2 are nozzles having port into a deflection chamber 13, respectively opposite orifices 1a and 2a extended by ducts 1b and 2b, respectively, which converge towards the outlet 3. The nozzles 1 and 2 are directed convergently, in such manner that the jets 14, 15, which they emit deflect each other mutually when the two nozzles are supplied simultaneously, whereby a resultant jet 16 is formed which penetrates into a tube 4a leading to the outlet 4.

An examination of the accompanying drawing shows that if the signals $a$ and $b$ be applied to inlets 1 and 2 respectively, the signal $a \otimes b$ will be picked up at the outlet 3 and the signal $a.b$ at 4. In FIGURE 3, $a$ and $b$ are "zero," and there will be no jet if "zero" is picked up at the two outlets. In FIGURES 3a or 3b, the single jet 15 (or 14) emerges directly through the orifice 2a (or 1a) and reaches 3, where the "one" signal is picked up, the "zero" signal being picked up at 4. In FIGURE 3c, the two "one" signals give two jets 14 and 15 which form the jet 16 which issues at 4 and provides the "one" signal, the "zero" signal being picked up at 3. Thus, the valve does indeed perform the EXCEPT-operation at 3 and the AND-operation at 4.

It was stated precedingly that if $a$ and $b$ are the digits of identical weight of two binary numbers, then $a \otimes b$ will be their sum and $a.b$ the carry-over. The valve in FIGURE 1, or that of FIGURES 2 and 3, thus constitutes a basic logic circuit known as a "half-adder." FIGURES 4 and 5 show for comparison purposes the circuit diagrams of two conventional electronic half-adders.

FIGURE 4 shows the circuit diagram of the half-adder. In an electronic machine, an EXCEPT-circuit cannot be provided directly. The latter is therefore constructed from two complement generators, two AND-circuits and one EXCEPT-circuit. A third AND-circuit enables the carry-over to be obtained. The half-adder has two inputs: $a$ and $b$. The output from complement generators $R_1$ and $R_2$ provides $a$ and $b$ and their complements $\bar{a}$ and $\bar{b}$, which are applied to the $AND_1$ and $AND_2$ circuits. Finally, the INCLUDING-circuit performs the operation $(a.\bar{b})\ (\bar{a}.b) = a \otimes b$. The result is equal to the sum S; this is the digit of same weight as $a$ and $b$ of the sum. The carry-over $r$ is formed by the $AND_3$-circuit.

The diagram in FIGURE 5 represents that of a simpler electronic half-adder resulting from application of the equation:

$$a \otimes b = (a.\bar{b}) \vee (\bar{a}.b) = (a \vee b) \cdot (\overline{a.b})$$

which is a form of Morgan's theorem. The circuit comprises at the input end an INCLUDING-circuit for performing the $(a \vee b)$ operation and an $AND_1$-circuit which provides the product $a.b$. This product enters the complement generator $R_1$ from which emerge the carry-over $(a.b)$ and its complement $(\overline{a.b})$. The latter is applied to another $AND_2$-circuit from which is obtained $$(a \vee b) \cdot (\overline{a.b})$$

which is equal to the sum.

A comparison between FIGURES 4 and 5, on the one hand, and the previous figures on the other, shows that the pneumatic basic logic circuit according to this invention is indeed much simpler than an electronic half-adder, which comprises at least four basic circuits.

FIGURE 6 shows an embodiment of a pneumatic adder utilizing three valves identical to that of FIGURE 3. FIGURE 7 is the circuit diagram of this adder. The latter permits of adding two binary numbers having any number of digits $n$, by using the series notation, i.e., by simultaneously applying to the two inlets 1, 2, the two digits $a_p$ and $b_p$ of weight $p$, the pulses representing the digits of successive weight being dispatched at a determinate rate controlled by a device well known per se, termed a clock.

It is well known that the carry-over resulting from the addition of the digits of weight $p-1$ must be added to the sum of the digits of weight $p$. Provision must therefore be made for two half-adders in cascade form. The first half-adder 17 adds $a_p$ and $b_p$ together. Their sum is applied to the input 19 of the second half-adder 18 where it meets the carry-over $r_p-1$ issuing from the previous operation. The carry-overy $r_p$, however, is injected into a delay element $Rd$ where it is time-delayed by a period $\theta$ whereby to be applied to the input 20 of the second half-adder 18 in the course of the next operation. At the output end 21 of half-adder 18 is picked up the digit of position $p$ of the sum $S_p$, while the possible carry-over of the second half-adder is returned to the same delay element $Rd$. Provision must consequently be made at the input end of said delay element for an element 22 capable of properly passing on the carry-over issuing from 17 or from 18. These two carry-overs are never "one" simultaneouly and, since "zero" is represented by the absence of a pulse in the pneumatic circuit, the element 22 may be an EXCEPT-element.

It goes without saying that the element 22 could alternatively be an INCLUDING-element. If the adder circuit were to be constituted with valves according to FIGURE 2, said element 22 would compulsorily be an INCLUDING-element, as indeed in all cases where the digit "zero" is represented by a pulse, as this element must be capable of simultaneously passing on two carry-overs equal to "zero."

The device $Rd$ transmits the signals, time-delayed by $\theta$, through a capillary tube. A form of embodiment of this device will be described hereinafter with reference to FIGURE 8.

FIGURE 6 shows the disposition of the circuit for adding two digits $a_p$ and $b_p$ equal respectively to "one" and "zero," the carry-over $r_p-1$ from the previous operation being "one." This carry-over $r_p-1$ dispatched by the by the element $Rd$ enters via 20 into the element 18 wherein it is added to the digit "one" reaching 19, whereby to produce a carry-over $r_p$ equal to "one" that is returned to the element $Rd$, a value $S_p$ equal to "zero" being picked up at the output 21.

The diagram of FIGURE 7 shows the condition of the lines at cycles $\theta$, $2\theta$, $3\theta$, $4\theta$ and $5\theta$ when performing the additon of two binary numbers 01011 and 00101.

The delay device shown in FIGURE 8 is placed at the output end 22a of element 22 and basicaly comprises a relay 23, a delay element 24, a transmitting element 26 which dispatches with a time-delay $\theta$ the signals from tube 22a to a tube 20a extending to the input 20 of element 18 (see FIGURE 6), and a blocking element 27.

The relay 23 consists of a slide-valve which receives on one side of fixed functional pressure $m$ less than the pressure $h$ constituting the "one" signal and, on the other side, the total pressure picked up by a nozzle 22b within tube 22a, the outlet 22c of which tube is vented to the open air. If the signal transmitted to tube 22a is "one," this total pressure will be greater than $m$ and the slide-valve will assume the position shown, wherein the input 25 to the delay element communicates with a tank 28 in which the pressure $h$ is continuously maintained, whereby the element 24 receives the "one" signal. If the signal transmitted to tube 22a is "zero," i.e., a zero pressure, the slide-valve 23 descends and places the inlet 25 in communication with a vented tube 29, whereby the element 24 receives the "zero" signal.

The delay element 24 comprises two capillary tubes 30, 31 parallel-connected to the input 25. The output end 30a of the first capillary tube extends to the transmitter element 26 and the output end 31a of the second capillary tube to the gating element 27, each of these elements consisting of a slide-valve.

Thus, the slide-valve 26 receives on one side the pressure prevailing at 30a and on the other the functional pressure $m$. In the position shown in solid lines, the pressure at 30a is less than $m$ and the slide-valve masks an inlet 26a which is continuouly subjected to the pressure $h$. When the "one" signal is applied to the inlet of capillary tube 30, the pressure at the outlet end 30a thereof increases progressively and exceeds $m$ after a time-lapse $\theta$, whereupon the slide-valve assumes the position shown in dotted lines wherein the inlet 26a is placed in communication with the outlet 20a, which thus receives a high-pressure pulse.

At this point the slide-valve 27, which sustains on one side the pressure prevailing at 31a and on the other a pressure $b_1$ less than $m$, will already have assumed the position shown in dotted lines, since the pressure at 31a increases at the same time as the pressure at 30a due to the fact that the fluid originating from 25 flows in parallel through the two capillary tubes. The pressure at 31a exceeds the value $b_1$ before the pressure at 30a has reached the value $m$. In this position, the slide-valve 27 places the tube 20a in communication with the left side of slide-valve 26, which consequently receives the pressure $h$, as a result of which slide-valve 26 remains blocked in the position shown in dotted lines, wherein it emits a "one" signal.

If the "zero" signal succeeds upon the "one" signal at the input end of the device, the input 25 of the delay element will be vented and the pressure at 30a and at 31a will gradually decrease as the fluid drains through the capillary tubes 30 and 31. The pressure at 31a will drop below the value $b_1$ and the slide-valve 27 will move leftwardly and mask once more the communication port between 30a and tube 20a. As soon as a time-delay $\theta$ has elapsed subsequent to the venting of input 25, the pressure at 30a will drop below the value $m$ and the slide-valve 26, being no longer blocked, will return to the left and mask the inlet 26a. Thus, the "zero" signal succeeds upon the "one" signal in the outlet tube 20a after a time-lapse $\theta$.

It will be seen, therefore, that the device hereinbefore described transmits, with the time-delay $\theta$, the "one" and "zero" signals in the form of pressure pulses at levels $h$ and zero respectively. Were it desired to obtain "zero" signals in the form of pressure pulses ta $b$ level, it would suffice, for instance, to add to the element 26 a second inlet 32 that is continuously subjected to the pressure $b$, which inlet is shown in dotted lines in the figure.

Correct operation of the device as described hereinabove, for the purpose of transmitting the signals with the time-delay $\theta$, depends uniquely on correctly selecting capillary tubes 30 and 31 and the pressure levels $h$, $m$ and $b_1$.

I claim:

1. A fluid full adder having a pair of end inlet ports for successively receiving fluid pressure input signals defining the digits of successive weights of two binary members, respectively, fed to said inlet ports at intervals of time spaced by a constant period, an outlet end port for successively delivering fluid pressure output signals defining the digits of successive weights of the sum of said members, and an intermediate port, comprising: an assembly of a first fluid half adder component, a second fluid half adder component and a fluid logic element, said first fluid half adder component including said inlet ports, an EXCLUSIVE-OR outlet port, and an AND outlet port, said second fluid half adder component including a first inlet port connected to said EXCLUSIVE-OR outlet port, a second inlet port, an EXCLUSIVE-OR outlet port forming said end outlet port, and an AND outlet port, said fluid logic element being connected to both AND outlet ports and adapted to convey fluid output pressure signals therefrom to said intermediate outlet port of the assembly; and, a delay component connected to said second inlet port of said assembly and to said intermediate outlet port of said assembly, adapted to retain the pressure signals issuing therefrom for a time substantially equal to said constant period.

2. A fluid full adder as defined in claim 1, wherein each of said first and second fluid half adder components is a fluid valve comprising: a deflection chamber, a pair of nozzles arranged in said deflection chamber each of which is connected to an inlet port of said valve, a pair of receiving orifices connected to the EXCLUSIVE-OR outlet port of said valve each of which is aligned axially with a corresponding one of said nozzles, and a further receiving orifice connected to the AND outlet port of said valve and adapted to receive a jet of fluid resulting from mutual deflection of inlet jets of fluid emitted by both nozzles when said nozzles are simultaneously fed with fluid.

3. A fluid full adder as defined in claim 1 wherein each of the first and second fluid half adder components is a valve component comprising: a pair of inlet passages respectively connected to the inlet ports of the assembly for receiving high and low-pressure fluid input signals defining digits "1" and "0," respectively; first and second outlet passages connected to the EXCLUSIVE-OR and AND outlet ports, respectively; and means for producing a high-pressure fluid signal in the first outlet passage and a low-pressure fluid signal in the second outlet passage, responsive to a high-pressure fluid signal in one of the said inlet passages, said means also producing a low-pressure fluid signal in the first outlet passage and a high-pressure fluid signal in the second outlet passage, responsive to both high-pressure and low-pressure fluid signals in both inlet passages.

References Cited

Mitchell, A. C.: Fluid Binary Full Adder, in IBM Technical Diclosure Bulletin, vol. 5, No. 6, November 1962, pp. 26, 27.

Ezekiel, F. C.: Hydraulic Half-Add Binary Numbers, in Control Engineering, February 1961, p. 145.

M. CARY NELSON, *Primary Examiner.*

W. CLINE, *Assistant Examiner.*